United States Patent
Alve et al.

(10) Patent No.: US 8,495,749 B2
(45) Date of Patent: Jul. 23, 2013

(54) METHOD, APPARATUS AND COMPUTER PROGRAM PRODUCT FOR A CONTENT PROTECTION SYSTEM FOR PROTECTING PERSONAL CONTENT

(75) Inventors: Jukka Antero Alve, Vantaa (FI); Juha-Pekka Luoma, Espoo (FI)

(73) Assignee: Nokia Corporation, Espoo (FI)

( * ) Notice: Subject to any disclaimer, the term of this patent is extended or adjusted under 35 U.S.C. 154(b) by 553 days.

(21) Appl. No.: 12/355,063

(22) Filed: Jan. 16, 2009

(65) Prior Publication Data

US 2010/0186090 A1 Jul. 22, 2010

(51) Int. Cl.
*H04L 29/06* (2006.01)
(52) U.S. Cl.
USPC .................................................. 726/26
(58) Field of Classification Search
USPC .............. 726/26, 2, 7; 380/201, 205; 713/176
See application file for complete search history.

(56) References Cited

U.S. PATENT DOCUMENTS

| | | | |
|---|---|---|---|
| 7,512,606 B2 * | 3/2009 | Laonipon et al. ..................... 1/1 |
| 7,765,603 B2 * | 7/2010 | Tanaka ............................. 726/28 |
| 2003/0076955 A1 * | 4/2003 | Alve et al. ..................... 380/201 |
| 2005/0177875 A1 * | 8/2005 | Kamperman et al. .......... 726/27 |
| 2006/0020784 A1 | 1/2006 | Jonker et al. |
| 2006/0026424 A1 | 2/2006 | Eto |
| 2006/0075424 A1 | 4/2006 | Talstra et al. |
| 2008/0152146 A1 * | 6/2008 | Conrado et al. .............. 380/278 |
| 2008/0249961 A1 * | 10/2008 | Harkness et al. ............. 705/400 |
| 2009/0177735 A1 * | 7/2009 | Algie et al. ................... 709/203 |

FOREIGN PATENT DOCUMENTS

| | | |
|---|---|---|
| EP | 1 619 898 A1 | 1/2006 |
| WO | WO 02/08945 A1 | 1/2002 |
| WO | WO 03/083627 A2 | 10/2003 |
| WO | WO 2005/093544 A1 | 10/2005 |

OTHER PUBLICATIONS

International Search Report and Written Opinion issued in connection with International Application No. PCT/IB2010/000067 and mailed on Apr. 22, 2010.
Supplemental European Search Report and Opinion for Application No. 10731101.1 dated Jun. 6, 2012.
Office Action for European Application No. 10731101.1; dated Apr. 8, 2013.

* cited by examiner

*Primary Examiner* — Ali Abyaneh
(74) *Attorney, Agent, or Firm* — Alston & Bird LLP (57) ABSTRACT

An apparatus for providing a content protection system for protecting personal content may include a processor configured to receive an indication of personal content submitted for inclusion in a content protection system, and determine admissibility of the personal content to the content protection system based at least in part on indicia associated with a source device from which the personal content originated. A corresponding method and computer program product are also provided.

17 Claims, 3 Drawing Sheets

METHOD, APPARATUS AND COMPUTER PROGRAM PRODUCT FOR A CONTENT PROTECTION SYSTEM FOR PROTECTING PERSONAL CONTENT

TECHNOLOGICAL FIELD

Embodiments of the present invention relate generally to content sharing technology and, more particularly, relate to an apparatus, method and a computer program product for providing a content protection system for protecting personal content.

BACKGROUND

The modern communications era has brought about a tremendous expansion of wireline and wireless networks. Computer networks, television networks, and telephony networks are experiencing an unprecedented technological expansion, fueled by consumer demand. Wireless and mobile networking technologies have addressed related consumer demands, while providing more flexibility and immediacy of information transfer.

Current and future networking technologies continue to facilitate ease of information transfer and convenience to users by expanding the capabilities of mobile electronic devices. One area in which there is a demand to increase ease of information transfer relates to the sharing of information between multiple devices and potentially between multiple users. In this regard, given the ability for modern electronic devices to create and modify content, and also to distribute or share content, it is not uncommon for users of such devices to become prolific users and producers of media content. Networks and services have been developed to enable users to move created content to various points within the networks.

To complement mechanisms for distribution and sharing of personal content, mechanisms have also been developed to provide for distribution of commercial content. In order to prevent unauthorized use or copying of commercial content, there has been an increased need for content protection sometimes in the form of digital rights management (DRM). Content protection systems such as, for example, DVB CPCM (Digital Video Broadcast Content Protection and Copy Management) have been developed to provide protection against inappropriate use of commercial content. DVB CPCM manages usage of commercial digital content delivered to consumer products and home networks from acquisition into the system until final consumption, or export from the system, in accordance with the particular usage rules associated with the commercial digital content. Examples of commercial digital content may include all types of content such as audio, video and associated applications and data any of which may be received via broadcast services, Internet-based services, packaged media, and mobile services, and the like. An exemplary content protection system such as DVB CPCM may provide specifications to facilitate interoperability of content after acquisition by networked consumer devices for both home networking and remote access. Thus, a typical content protection system may define signaling and technical compliance standards to ensure interoperability.

Given that a content protection system that is designed to provide protection for commercial content may add some implication of legitimacy to the content being presented by the system, offering content via a content protection system may be a desirable mechanism by which certain individuals may desire to offer personal content to others. However, the implication of legitimacy may be misused in some cases. For example, bootlegged movies, music and other content that has been illegally copied or acquired may undergo "content laundering" by uploading such content to a content protection system and making the content freely available via the content protection system. To prevent content laundering from making illegitimate content appear to be legitimate, many content providers are reluctant to accept any personal or user-created content into a content protection system.

Despite the issues described above, there may be legitimate reasons why personal content may benefit from being protected via a content protection system. For example, a user may wish to send photographs from a party to individuals who where at the party, but may not wish to allow those individuals to further distribute the content to their friends or post the content on the Internet. Accordingly, it may be desirable to provide an improved content protection system with respect to handling personal content.

BRIEF SUMMARY

A method, apparatus and computer program product are therefore provided that may provide a content protection system for handling personal content. Thus, for example, it may be possible to enable distribution of personal content through a content protection system to other users with restrictions on the activities such users may undertake with respect to the distributed content. Furthermore, it may be possible to freely move content (and possibly copy) content between different devices of the user providing the content for distribution.

In an exemplary embodiment, a method of providing a content protection system for protecting personal content is provided. The method may include receiving an indication of personal content submitted for inclusion in a content protection system, and determining admissibility of the personal content to the content protection system based at least in part on indicia associated with a source device from which the personal content originated.

In another exemplary embodiment, a computer program product for providing a content protection system for protecting personal content is provided. The computer program product includes at least one computer-readable storage medium having computer-executable program code instructions stored therein. The computer-executable program code instructions may include program code instructions for receiving an indication of personal content submitted for inclusion in a content protection system, and determining admissibility of the personal content to the content protection system based at least in part on indicia associated with a source device from which the personal content originated.

In another exemplary embodiment, an apparatus for providing a content protection system for protecting personal content is provided. The apparatus may include a processor. The processor may be configured to receive an indication of personal content submitted for inclusion in a content protection system, and determine admissibility of the personal content to the content protection system based at least in part on indicia associated with a source device from which the personal content originated.

In an exemplary embodiment, an apparatus for providing a content protection system for protecting personal content is provided. The apparatus may include means for receiving an indication of personal content submitted for inclusion in a content protection system, and means for determining admissibility of the personal content to the content protection system based at least in part on indicia associated with a source device from which the personal content originated.

Accordingly, embodiments of the present invention may enable improved capabilities with respect to sharing content on multiple devices.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Some embodiments of the present invention will now be described more fully hereinafter with reference to the accompanying drawings, in which some, but not all embodiments of the invention are shown. Indeed, various embodiments of the invention may be embodied in many different forms and should not be construed as limited to the embodiments set forth herein. Like reference numerals refer to like elements throughout. As used herein, the terms "data," "content," "information" and similar terms may be used interchangeably to refer to data capable of being transmitted, received and/or stored in accordance with embodiments of the present invention. Moreover, the term "exemplary", as used herein, is not provided to convey any qualitative assessment, but instead merely to convey an illustration of an example. Thus, use of any such terms should not be taken to limit the spirit and scope of embodiments of the present invention.

As indicated above, embodiments of the present invention may be employed in methods, apparatuses and computer program products in order to provide a content protection system with capabilities for handling personal content while addressing content provider concerns regarding the possibility of content laundering. In this regard, for example, embodiments of the present invention may provide for personal content to be introduced into the content protection system when certain conditions are met. One example condition for introduction of personal content into the content protection system may include source authentication. In this regard, if the content to be introduced into the system originates from an authenticated source of personal content, the content may be allowed into the system. Another example condition may include copying restrictions. In this regard, for example, a usage state associated with the content to be introduced into the system may not allow unrestricted copying of the content (at least to devices not associated with the authorized domain of the user proving the content) in order to remove the typical motivation of content launders. As yet another example condition, personal content may be segregated from commercial content while in the content protection system. Segregation of personal and commercial content may facilitate managing personal content with slightly different usage rules and potential extensions to existing content protection system usage states to enable provision of personal content protection.

Thus, personal content may be created, copied, modified and distributed in association with the content protection system and benefit from the protections afforded by the system. However, even though embodiments of the present invention may enable a user to place restrictions on distribution of personal content to other users, an authorized domain of the user, which may include personally owned devices (e.g., a media player, a mobile telephone, a laptop computer or personal computer (PC), a camera or video camera, and/or others) of the user that are registered as belonging to the user, may be enabled to freely move content between devices.

Figure 1:
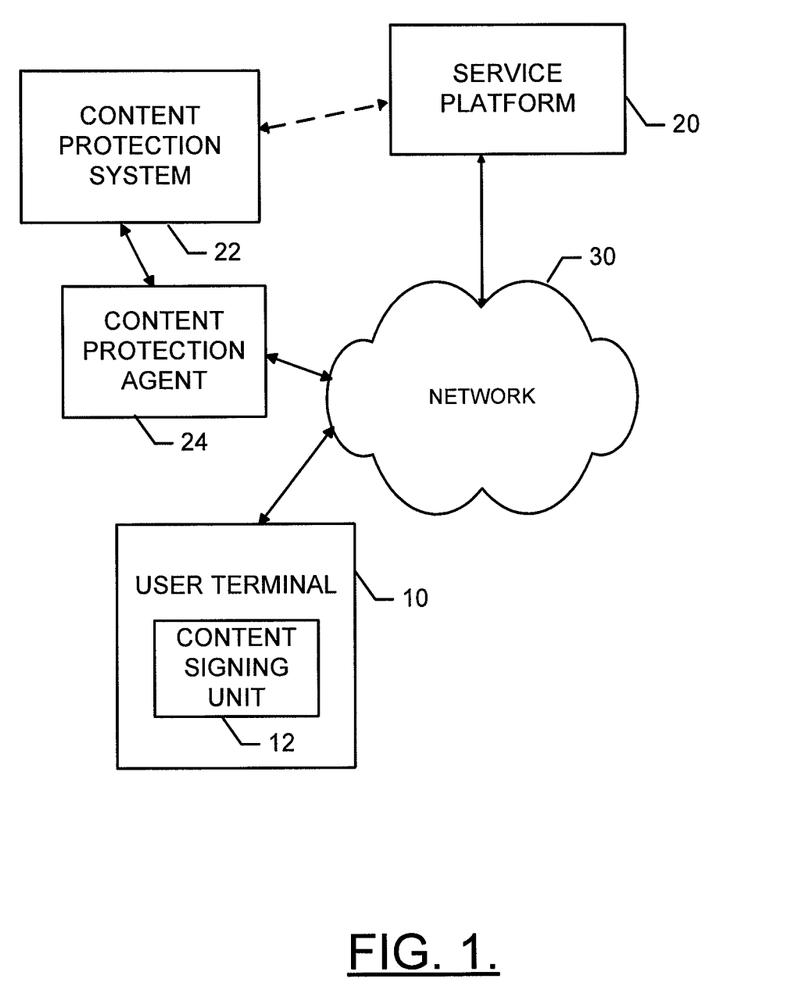
FIG. 1 is a schematic block diagram of a system according to an exemplary embodiment of the present invention.

FIG. 1 illustrates a block diagram of a system that may benefit from embodiments of the present invention. It should be understood, however, that the system as illustrated and hereinafter described is merely illustrative of one system that may benefit from embodiments of the present invention and, therefore, should not be taken to limit the scope of embodiments of the present invention. Moreover, although DVB CPCM is referred to as one example of a content protection system, it should be understood that embodiments of the present invention are not limited to application with DVB CPCM, but may be used in connection with other content protection systems as well.

As shown in FIG. 1, an embodiment of a system in accordance with an example embodiment of the present invention may include a user terminal 10 capable of communication with numerous other devices including, for example, a service platform 20 via a network 30. The service platform 20 may be a server, server bank or other computer configured to provide one or more services (e.g., Internet services) via the network 30. In an exemplary embodiment, the service platform 20 may provide, among other things, content management, content sharing, content acquisition and other services related to communication and media content. Nokia's Ovi suite is an example of a service provision mechanism that may be associated with the service platform 20. In some cases, the service platform 20 may include, be associated with, or otherwise be functional in connection with a content protection system 22. The content protection system 22 may be configured to provide content protection services as described herein in order to enable DRM with respect to content introduced into the content protection system 22. The content protection system 22 may be any means such as a device or circuitry embodied in hardware, software or a combination of hardware and software that is configured to perform the corresponding functions of the content protection system 22 as described herein. As such, for example, the content protection system 22 may, in some cases, be embodied as a server, server bank or other computing device. The content protection system 22 may be configured to provide for storage of content (in some cases segregated on the basis of commercial or personal content classification) and distribution according to specified rules. For example, content may only be distributed to authorized users.

In an exemplary embodiment, a content protection agent 24 may be employed to screen content intended for submission to the content protection system 22. In this regard, for example, the content protection agent 24 may act as a gateway or access control mechanism configured to apply predefined rules and or criteria in order to determine whether content submitted for inclusion in the content protection system 22 is allowed to be entered into the content protection system 22. Furthermore, if the submitted content is selected by the content protection agent 24 for inclusion in the content protection system 22, the content protection agent 24 may define conditional parameters or usage state parameters that may apply to the content. The usage state parameters may instruct the content protection system 22 in relation to specific rules governing storage and/or distribution of the content. The content protection agent 24 may be any means such as a device or circuitry embodied in hardware, software or a combination of hardware and software that is configured to perform the corresponding functions of the content protection agent 24 as described herein. In some cases, the content protection agent 24 may be embodied at the content protection system 22, as shown in FIG. 1. However, in alternative embodiments, the content protection agent 24 may be embodied at another device in the system (e.g., at the service platform 20, the user terminal 10, etc.).

In some embodiments of the present invention, the system may further include one or more additional devices such as personal computers (PCs), servers, network hard disks, file storage servers, and/or the like, that are capable of communication with the user terminal 10 and accessible by the service platform 20. In some cases, the user terminal 10 may be an acquisition point for content entering the content protection system 22 (e.g., via the content protection agent 24). As such, the user terminal 10 may be enabled to provide content directly to the content protection system 22. However, in some embodiments, the user terminal 10 may be configured to provide content to the content protection system 22 via a physically separate acquisition point in the form of the content protection agent 24. The acquisition point (e.g., in the form of the content protection agent 24) may be a communication device capable of communication with one or more user terminals in order to provide content submitted by the user terminal(s) to the content protection system 22. As such, the acquisition point, which may itself be embodied as a computing device, server or other communication device or as a portion of a computing device, server or other communication device configured to communicate with the content protection system 22 via the network 30, may be an agent configured to determine whether the source of the content is an authorized and/or trusted device for submitting content to the content protection system 22.

The user terminal 10 may be any of multiple types of fixed or mobile communication and/or computing devices such as, for example, portable digital assistants (PDAs), pagers, mobile televisions, mobile telephones, gaming devices, laptop computers, PCs, cameras, camera phones, video recorders, audio/video players, radios, global positioning system (GPS) devices, or any combination of the aforementioned, and other types of voice and text communications systems, which employ embodiments of the present invention.

The network 30 may include a collection of various different nodes, devices or functions that may be in communication with each other via corresponding wired and/or wireless interfaces. As such, the illustration of FIG. 1 should be understood to be an example of a broad view of certain elements of the system and not an all inclusive or detailed view of the system or the network 30. Although not necessary, in some embodiments, the network 30 may be capable of supporting communication in accordance with any one or more of a number of first-generation (1G), second-generation (2G), 2.5G, third-generation (3G), 3.5G, 3.9G, fourth-generation (4G) mobile communication protocols, Long Term Evolution (LTE), and/or the like. Thus, the network 30 may be a cellular network, a mobile network and/or a data network, such as a local area network (LAN), a metropolitan area network (MAN), and/or a wide area network (WAN), e.g., the Internet. In turn, other devices such as processing elements (e.g., personal computers, server computers or the like) may be included in or coupled to the network 30. By directly or indirectly connecting the user terminal 10 and the other devices to the network 30, the user terminal 10 and/or the other devices may be enabled to communicate with each other, for example, according to numerous communication protocols including Hypertext Transfer Protocol (HTTP) and/or the like, to thereby carry out various communication or other functions of the mobile terminal 10 and the other devices, respectively. As such, the user terminal 10 and the other devices may be enabled to communicate with the network 30 and/or each other by any of numerous different access mechanisms. For example, mobile access mechanisms such as wideband code division multiple access (W-CDMA), CDMA2000, global system for mobile communications (GSM), general packet radio service (GPRS) and/or the like may be supported as well as wireless access mechanisms such as wireless LAN (WLAN), Worldwide Interoperability for Microwave Access (WiMAX), WiFi, ultra-wide band (UWB), Wibree techniques and/or the like and fixed access mechanisms such as digital subscriber line (DSL), cable modems, Ethernet and/or the like. Thus, for example, the network 30 may be a home network or other network providing local connectivity.

In an example embodiment, the service platform 20 may be a device or node such as a server or other processing element. The service platform 20 may have any number of functions or associations with various services. As such, for example, the service platform 20 may be a platform such as a dedicated server (or server bank) associated with a particular information source or service (e.g., Nokia's Ovi suite), or the service platform 20 may be a backend server associated with one or more other functions or services. As such, the service platform 20 represents a potential host for a plurality of different services or information sources. In some embodiments, the functionality of the service platform 20 is provided by hardware and/or software components configured to operate in accordance with known techniques for the provision of information to users of communication devices. However, at least some of the functionality provided by the service platform 20 may be data processing and/or service provision functionality provided in accordance with embodiments of the present invention.

The term "personal content" as used herein may refer to content including, audio, video and/or media content that is not commercial in nature. In other words, personal content is not distributed in exchange for monetary compensation. Embodiments of the present invention enable personal content to be introduced into a content protection system 22 via an acquisition point (e.g., the content protection agent 24) that is authorized to provide such content. In some embodiments, the acquisition point may be integrated within the user terminal 10. As such, for example, the user terminal 10 may represent a single physical device configured to create content (e.g., via a camera and perhaps also a microphone) and also provide the created content to the content protection system 22. By robust construction, the user terminal 10 according to this example may be configured to prevent digital content from other, unauthorized sources from being introduced to the content protection system 22 via the acquisition point 40.

In an alternative embodiment, the acquisition point may not be a part of the user terminal 10. As such, for example, the user terminal 10 may be connected to the acquisition point via the network 30, in some cases, via a secure link. In such an embodiment, the acquisition point may be configured to determine whether the source of the content submitted (e.g., the user terminal 10) is capable of being positively authenticated. In this regard, for example, the acquisition point may be configured to utilize a digital certificate associated with the source as a tool for authentication of the source of personal content.

In another alternative embodiment, the user terminal 10 (e.g., as an authentic source of personal content) may mark the content with a watermark or other identifier, which positively identifies the content as originating from an authentic source of personal content. The acquisition point may be configured to look for the watermark as a condition for allowing the content to enter the content protection system.

In yet another alternative embodiment of the present invention, the acquisition point may be implemented as part of a trusted content sharing service (e.g., the service platform 20) associated with a particular user account, and therefore part of the particular user's authorized domain. A digital fingerprint such as pHash (a perceptual hashing algorithm) may be calculated for each item of content (or randomly for some of the content items) uploaded by users to a content sharing service of the service platform 20. The digital fingerprint may be compared pairwise against known fingerprints of commercial content items. If an exact or near match is determined, results may include: blocking the user's current upload and possibly future uploads to the acquisition point, and/or notifying the content owner. Since checking the hash of each user-provided content clip against hashes of a large number of commercial content items may be a time consuming evolution, and consumption of too much time may be undesirable, in some embodiments the check of hashes may be done as a background job on the server side (e.g., at the service platform 20) without causing a delay to the user in relation to uploading the content. In some embodiments, the check may be done only on some portion of the content submitted on, for example, a random sampling basis. Such a random check may still act as a deterrent for illegal commercial content redistribution attempts.

In some cases, a separate personal content signing unit 12 may be included or otherwise usable in connection with existing photo or video capturing/editing devices to sign content with the user's personal signature or some other indicia associated with the user and registered to the service platform 20 for the user. The content signing unit 12 may be any means such as a device or circuitry embodied in hardware, software or a combination of hardware and software that is configured to perform the corresponding functions of the content signing unit 12 as described herein. Although shown in connection with the user terminal 10 in FIG. 1, the content signing unit 12 may alternatively be located at another location in the user's home, co-located with the service platform 20, or at the premises of a trusted third party. As such, users may register their corresponding contact information to a content sharing service provider associated with the service platform 20. The registered contact information may be associated with the signature or other indicia of the user's cameras or other content creation devices or may be associated with the personal signature of the user. In some cases, the contact information may only be accessible to authorities, for example, encrypted with key escrow in a database of the content sharing service provider, to assist in investigations of illegal commercial content redistribution.

The signature or other indicia of the user or of the user's content creation devices (e.g., camera) may also serve as a digital fingerprint, deterring attempts to use the camera to capture a movie or other commercial content off the screen of some other device. In some cases, fingerprints may allow tracing back to the source of content to thereby deter some legitimate activities, e.g. posting police brutality videos on a public content sharing service (e.g., YouTube). Thus, it may be advantageous to employ fingerprinting in a manner that makes it possible to prove that a certain video came from a corresponding certain camera, but impossible (at least without proper authorization) to compare two videos and prove they came from the same camera. One approach for doing this may be to include a random number in a signature block and encrypt the signature block with a public key associated with the content sharing service provider. Thus, only the content sharing service provider may be able to decrypt the signature block with the corresponding private key, after which signature checking may be possible.

In an exemplary embodiment, encrypting the signature block may be accomplished by an entity E, which may be, for example, the device originating personal content or a separate content signing unit. An exemplary procedure for creating the signature block is described below. However, it should be understood that the procedure described herein is merely one example and does not limit embodiments of the present application. In one example, a hash H(M) over media content may initially be calculated. The hash and the device ID may be encrypted with a unique session key K using symmetric encryption (e.g., $E_K(H(M), ID)$). The session key may be encrypted with the public key of the content sharing service provider $E_S(K)$. The signature block may be the concatenation of the encrypted session key and the result of the symmetric encryption (e.g., $SB(M)=E_S(K), E_K(H(M), ID)$). In an exemplary embodiment, as a reverse process, the sharing service provider may be able to use its private key to obtain the session key K of a signature block $K=D_S(E_S(K))$. The sharing service provider may also or alternatively be able to use session key K to obtain the device ID, together with the hash that correlates the signature block with the content (e.g., $H(M), ID=D_K(E_K(H(M), ID))$). With reference to the equations above, the term ID refers to a unique identifier of a device originating personal content. The term M refers to content such as, for example, a video, audio or photos. The term SB(M) refers to the signature block for content M. The term K refers to the unique session key. The term $E_K()$ refers to encryption of a message with key K. The term $E_S()$ refers to encryption of a message with the public key of an sharing service provider. The term $D_S()$ refers to decryption of a message with the corresponding private key of a sharing service provider. The term H() refers to calculation of a digest with a hash function, for example SHA or MD5.

An exemplary use case for protecting personal content may include providing enablement for giving single copies of pictures to semi-trusted friends and acquaintances, but preventing the recipients of the single copies from making further copies. In such a case, embodiments of the present invention may enable a provider of media content to freely copy the media content to the provider's authorized domain, but the media content may be marked "Copy No More" or in some other suitable fashion to prevent copying outside of the authorized domain. Since current content protection systems (e.g., the current DVB CPCM specification) do not include a usage state for restricting copying beyond the authorized domain, embodiments of the present invention may provide a usage state extension to enable such restriction.

As an alternative, content may be uploaded to a content sharing website (e.g., Ovi), which may provide access control to limit parties to which content viewing privileges are extended. The content may have a usage state set to enable viewing within the content protection system (e.g., VCPCM=Viewable within the entire CPCM system), but limit movement and/or copying of content to within the authorized domain (e.g., MAD=Movable within Authorized Domain). In an exemplary embodiment, software, hardware or a combination of software and hardware implemented at the content protection agent 24 in the form of an apparatus for employing embodiments of the present invention (e.g., apparatus 50 of FIG. 2) may implement a single content protection agent 24 for managing content distribution for all users or a separate content management entity for each registered user. Thus, in some embodiments, a separate instance of the content protection agent 24 in the form of a content protection and copy management mechanism or device may be instantiated for each registered user that can upload content. Each instance may then be joined to the authorized domain of the corresponding registered user before content is enabled to be uploaded. The access control may, in some embodiments, be based on passwords, and the password utilized for viewing may be different than the password utilized for joining a certain user's instance of the content protection agent 24 to his or her authorized domain.

In an exemplary embodiment, the content protection agent 24 may be configured to record or otherwise have access to information indicative of authentic sources of personal content. In some cases, certain kinds of devices may be considered authentic sources of personal content. Authentic sources may include cameras (e.g., still cameras or video cameras), musical instruments or players, and other devices (possibly also containing a microphone) that may generate media content. In some cases, an authentic source (e.g., a camera) may be an integrated portion or device within another device (e.g., a camera built inside a mobile phone). As such, if a content protection system acquisition point (e.g., the content protection agent 24) is able to positively identify that the content originates from such an authentic source of personal content, the acquisition point can allow the content to enter the content protection system 22.

The usage state applied to the personal content by the acquisition point (e.g., the content protection agent 24) may to some extent be under user control, but there may be a policy enforced by the acquisition point to define that the usage state does not allow unrestricted copying. In other words, the content protection agent 24 may define usage parameters defining allowable actions with respect to content submitted for inclusion in the content protection system 22. In this regard, for example, copying of content submitted for inclusion in the content protection system 22 may be limited to the authorized domain of the user submitting the content or to the local environment. In an alternative embodiment, an exemplary usage parameter or usage state may define a numerical limit to the number of copies that can be made of content submitted for inclusion in the content protection system 22. In some cases, combinations of usage states may also be provided. One exemplary rationale for conditioning acceptance of submitted content on the placement of usage parameters that may restrict sharing of the submitted content is that if the user does not want the content to have some kind of copying restriction, there is no reason to bring the content into the content protection system 22 in the first place. The user is naturally always allowed to keep unprotected copies of personal content outside the content protection system 22. However, for content submitted to the content protection system 22 policies restricting copying may reduce the content laundering threat, because the restriction would hinder attempts to illegally redistribute commercial content via the content protection system 22.

To further reduce the risk of laundering commercial content with trusted devices, even with reduced quality (for example by using a video camera to record a movie as it is played in a movie theater), digital fingerprinting techniques like the pHash mechanism described above may be employed to detect any commercial content uploaded to the system by a particular user. In some cases, personal content may be kept separate from commercial content throughout the lifecycle of the personal content within the content protection system 22 by dedicating a Compliance and Robustness Regime (C&R regime) supported by the content protection system 22 to personal content. As an example, DVB CPCM Content Licenses may have a field called "C&R regime mask", each bit of which signals whether the content is available under that C&R regime. Likewise, CPCM Instance Certificates may have a matching field called C_and_R_regime_mask, which indicates which C&R regimes' content the CPCM Instance (or device) supports.

In an exemplary embodiment, an apparatus 50 is provided that may be employed at devices performing exemplary embodiments of the present invention. The apparatus 50 may be embodied, for example, as any device hosting, including, controlling or otherwise comprising the content protection agent 24. Thus, the apparatus 50 could be the user terminal 10, when the content protection agent 24 is embodied at the user terminal 10, or the apparatus could be a server or other device of the content protection system 22 or the service platform 20 or of the network 30 itself when the content protection agent 24 is embodied at a respective one of these entities. However, embodiments may also be embodied on a plurality of other devices such as for example where instances of the apparatus 50 may be embodied on both client side and server side devices. Thus, the apparatus 50 will be described in generic terms so as to have broad application to either client side or server side devices, As such, the apparatus 50 of FIG. 2 is merely an example and may include more, or in some cases less, than the components shown in FIG. 2.

Figure 2:
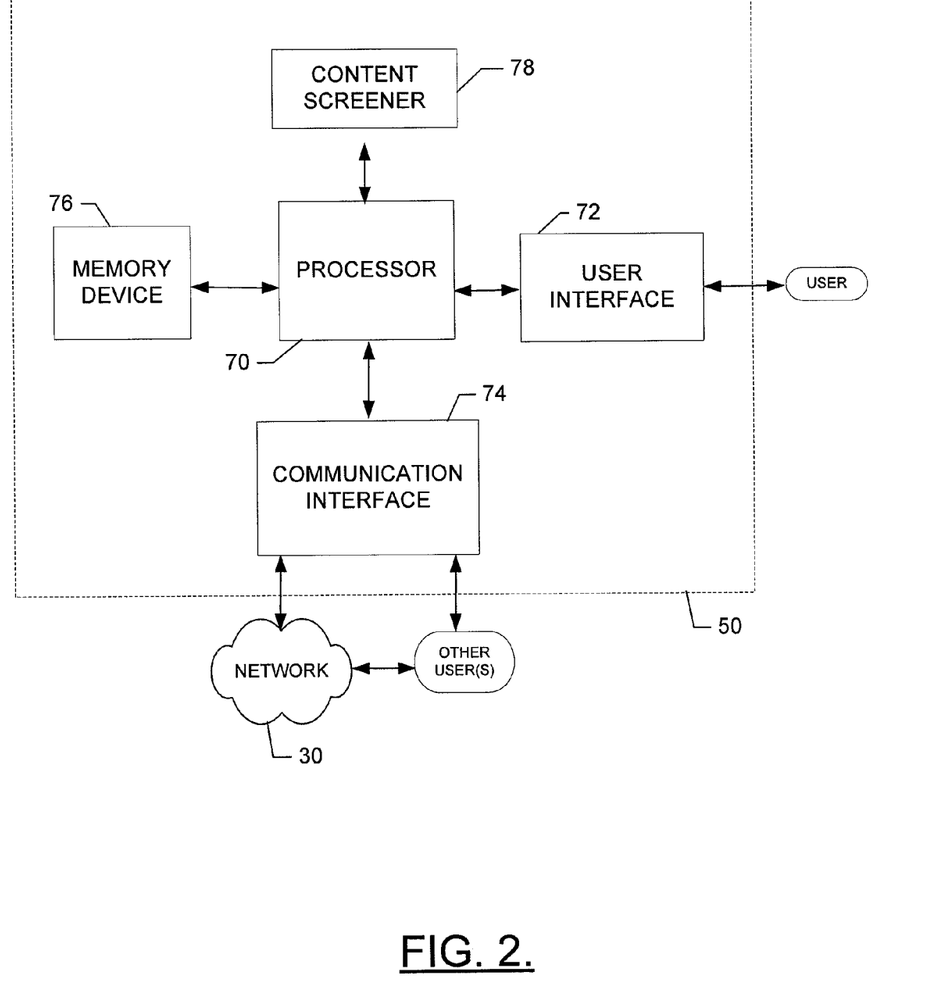
FIG. 2 is a schematic block diagram of an apparatus for providing a content protection system for protection of personal content according to an exemplary embodiment of the present invention.

Referring now to FIG. 2, an apparatus for employing content screening for submission of such content into a content protection system is provided. The apparatus 50 may include or otherwise be in communication with a processor 70, a user interface 72, a communication interface 74 and a memory device 76. The memory device 76 may include, for example, volatile and/or non-volatile memory. The memory device 76 may be configured to store information, data, files, applications, instructions or the like. For example, the memory device 76 could be configured to buffer input data for processing by the processor 70. Additionally or alternatively, the memory device 76 could be configured to store instructions for execution by the processor 70. As yet another alternative, the memory device 76 may be one of a plurality of databases or storage locations that store information and/or media content.

The processor 70 may be embodied in a number of different ways. For example, the processor 70 may be embodied as various processing means such as a processing element, a coprocessor, a controller or various other processing devices including integrated circuits such as, for example, an ASIC (application specific integrated circuit), an FPGA (field programmable gate array), a hardware accelerator, or the like. In an exemplary embodiment, the processor 70 may be configured to execute instructions stored in the memory device 76 or otherwise accessible to the processor 70. As such, whether configured by hardware or software methods, or by a combination thereof, the processor 70 may represent an entity capable of performing operations according to embodiments of the present invention while configured accordingly. Thus, for example, when the processor 70 is embodied as an ASIC, FPGA or the like, the processor 70 may be specifically configured hardware for conducting the operations described herein. Alternatively, as another example, when the processor 70 is embodied as an executor of software instructions, the instructions may specifically configure the processor 70, which may otherwise be a general purpose processing element if not for the specific configuration provided by the instructions, to perform the algorithms and operations described herein. However, in some cases, the processor 70 may be a processor of a specific device (e.g., a mobile terminal) adapted for employing embodiments of the present invention by further configuration of the processor 70 by instructions for performing the algorithms and operations described herein.

Meanwhile, the communication interface 74 may be any means such as a device or circuitry embodied in either hardware, software, or a combination of hardware and software that is configured to receive and/or transmit data from/to a network and/or any other device or module in communication with the apparatus 50. In this regard, the communication interface 74 may include, for example, an antenna (or multiple antennas) and supporting hardware and/or software for enabling communications with a wireless communication network (e.g., network 30). In fixed environments, the communication interface 74 may alternatively or also support wired communication. As such, the communication interface 74 may include a communication modem and/or other hardware/software for supporting communication via cable, digital subscriber line (DSL), universal serial bus (USB), Ethernet, High-Definition Multimedia Interface (HDMI) or other mechanisms. Furthermore, the communication interface 74 may include hardware and/or software for supporting communication mechanisms such as Bluetooth, Infrared, UWB, WiFi, and/or the like, which are being increasingly employed in connection with providing home connectivity solutions.

The user interface 72 may be in communication with the processor 70 to receive an indication of a user input at the user interface 72 and/or to provide an audible, visual, mechanical or other output to the user. As such, the user interface 72 may include, for example, a keyboard, a mouse, a joystick, a display, a touch screen, a microphone, a speaker, or other input/output mechanisms. In an exemplary embodiment in which the apparatus is embodied as a server or some other network devices, the user interface 72 may be limited, remotely located, or eliminated.

In an exemplary embodiment, the processor 70 may be embodied as, include or otherwise control a content screener 78. The content screener 78, according to some embodiments, is any means such as a device or circuitry embodied in hardware, software or a combination of hardware and software that is configured to perform content screening functions with respect to media content submitted for inclusion in the content protection system 22. In this regard, for example, the content screener 78 is configured to receive an indication of personal content submitted for inclusion in a content protection system 22 and determine whether such content is admissible for inclusion into the content protection system 22. In an exemplary embodiment, the content screener 78 may be configured to determine admissibility of the personal content to the content protection system 22 based at least in part on indicia associated with a source device from which the personal content originated. In other words, for example, if the source device is an authorized source (e.g., a known device associated with a registered user of services offered by the service platform 20), the personal content may be admitted to the content protection system.

In some embodiments, the content screener 78 may be configured to enable admission of the personal content into the content protection system 22 in such a way that the personal content is maintained separate from commercial content. As such, separate storage locations may be employed, or mechanisms may be employed to distinguish personal from commercial content within a single storage location (e.g., the memory device 76).

In an exemplary embodiment, the content screener 78 may further be configured to apply rules, for example, based on a usage state or usage parameters associated with the personal content, to govern usage, movement and/or copying of the personal content after the personal content is admitted to the content protection system 22. The rules applied by the content screener 78 may define, for example, that unrestricted movement and copying of admitted personal content may be done to devices associated with an authorized domain of the user submitting the personal content for inclusion in the content protection system. However, the rules may also define that unrestricted copying of the personal content is not allowable for devices not associated with the authorized domain. In an exemplary embodiment, the content screener 78 may be configured to detect indicia within the personal content such as determining whether the personal content includes a watermark indicative of the source device or a signature indicative of a device or the user. In some cases, the content screener 78 may also be configured to determine whether the personal content includes a digital fingerprint associated with known commercial content and base admissibility of the personal content on a comparison of the digital fingerprint of the personal content to that of known commercial content. In some cases, content comparisons may be performed based on a hash or perceptual hash of all or portions (in some cases random portions) of the contents being compared.

Accordingly, some embodiments of the present invention provide for enjoyment of protection being afforded to personal content provided by a content protection system (e.g., DVB CPCM), while still frustrating attempts to utilize the content protection system for content laundering of commercial content.

Figure 3:
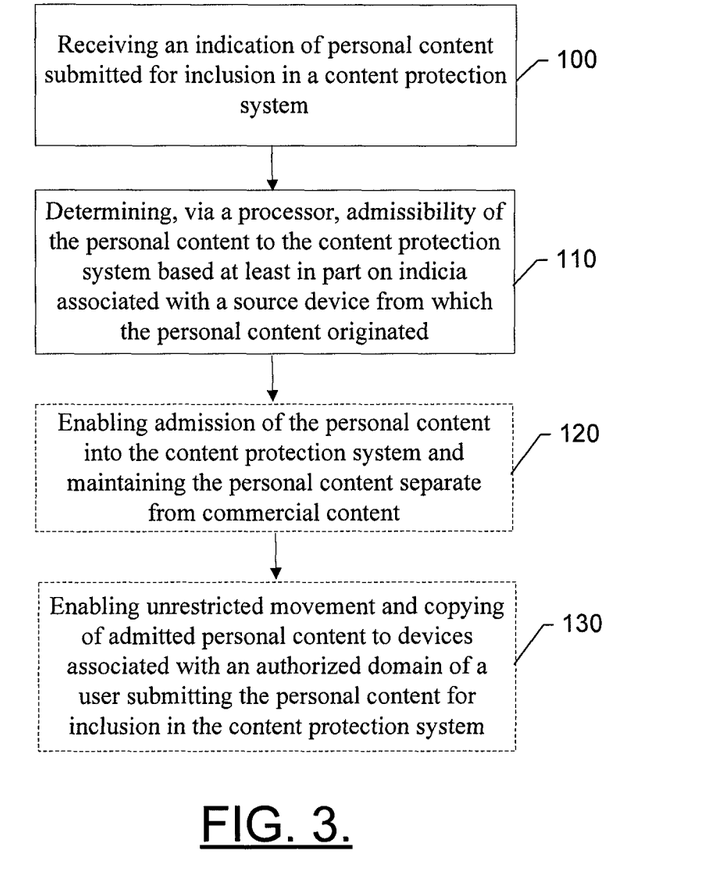
FIG. 3 is a flowchart according to an exemplary method for providing a content protection system for protecting personal content according to an exemplary embodiment of the present invention.

FIG. 3 is a flowchart of a system, method and program product according to exemplary embodiments of the invention. It will be understood that each block or step of the flowchart, and combinations of blocks in the flowchart, can be implemented by various means, such as hardware, firmware, and/or software including one or more computer program instructions. For example, one or more of the procedures described above may be embodied by computer program instructions. In this regard, in an example embodiment, the computer program instructions which embody the procedures described above are stored by a memory device (e.g., memory device 76) and executed by a processor (e.g., the processor 70). As will be appreciated, any such computer program instructions may be loaded onto a computer or other programmable apparatus (i.e., hardware) to produce a machine, such that the instructions which execute on the computer or other programmable apparatus create means for implementing the functions specified in the flowchart block(s) or step(s). In some embodiments, the computer program instructions are stored in a computer-readable memory that can direct a computer or other programmable apparatus to function in a particular manner, such that the instructions stored in the computer-readable memory produce an article of manufacture including instruction means which implement the function specified in the flowchart block(s) or step(s). The computer program instructions may also be loaded onto a computer or other programmable apparatus to cause a series of operational steps to be performed on the computer or other programmable apparatus to produce a computer-implemented process such that the instructions which execute on the computer or other programmable apparatus provide steps for implementing the functions specified in the flowchart block(s) or step(s).

Accordingly, blocks or steps of the flowchart support combinations of means for performing the specified functions, combinations of steps for performing the specified functions and program instruction means for performing the specified functions. It will also be understood that one or more blocks or steps of the flowchart, and combinations of blocks or steps in the flowchart, can be implemented by special purpose hardware-based computer systems which perform the specified functions or steps, or combinations of special purpose hardware and computer instructions.

In this regard, one embodiment of a method for providing a content protection system for protecting personal content as provided in FIG. 3 may include receiving an indication of personal content submitted for inclusion in a content protection system at operation 100, and determining admissibility of the personal content to the content protection system based at least in part on indicia associated with a source device from which the personal content originated at operation 110.

In some embodiments, the method may include further optional operations, examples of which are shown in dashed lines in FIG. 3. Optional operations may be performed in any order and/or in combination with each other in various alternative embodiments. As such, for example, the method may further include enabling admission of the personal content into the content protection system and maintaining the personal content separate from commercial content at operation 120. Additionally or alternatively, the method may include enabling unrestricted movement and copying of admitted personal content to devices associated with an authorized domain of a user submitting the personal content for inclusion in the content protection system at operation 130.

In some embodiments, certain ones of the operations above may be modified or further amplified as described below. It should be appreciated that each of the modifications or amplifications below may be included with the operations above either alone or in combination with any others among the features described herein. In this regard, for example, determining admissibility of the personal content may include determining whether the personal content includes a usage state defining that unrestricted copying of the personal content is not allowable for devices not associated with an authorized domain of a user submitting the personal content for inclusion in the content protection system. In some cases, determining admissibility of the personal content may include determining whether the personal content includes a watermark indicative of the source device or determining admissibility based on a determination regarding whether the personal content includes a digital fingerprint associated with known commercial content.

In an exemplary embodiment, an apparatus for performing the method of FIG. 3 above may comprise a processor (e.g., the processor 70) configured to perform some or each of the operations (100-130) described above. The processor may, for example, be configured to perform the operations (100-130) by performing hardware implemented logical functions, executing stored instructions, or executing algorithms for performing each of the operations. Alternatively, the apparatus may comprise means for performing each of the operations described above. In this regard, according to an example embodiment, examples of means for performing operations 100-130 may comprise, for example, the processor 70, the content screener 78, and/or an algorithm executed by the processor 70 for processing information as described above.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. An apparatus comprising:
   at least one processor and at least one memory including computer program code, the at least one memory and the computer program code configured to, with the at least one processor, cause the apparatus to at least:
   receive an indication of personal content submitted for inclusion in a content protection system;
   determine admissibility of the personal content to the content protection system based at least in part on indicia associated with a source device from which the personal content originated,
   said indicia verifying that the personal content comes from an authentic non-commercial source; and
   enable admission of the personal content into the content protection system and maintain the personal content separate from commercial content.

2. The apparatus of claim 1, wherein the processor is configured to determine admissibility of the personal content by determining whether the personal content includes a usage state defining that unrestricted copying of the personal content is not allowable for devices not associated with an authorized domain of a user submitting the personal content for inclusion in the content protection system.

3. The apparatus of claim 1, wherein the processor is further configured to enable unrestricted movement and copying of admitted personal content to devices associated with an authorized domain of a user submitting the personal content for inclusion in the content protection system.

4. The apparatus of claim 1, wherein the processor is configured to determine admissibility of the personal content by determining whether the personal content includes a watermark indicative of the source device.

5. The apparatus of claim 1, wherein the processor is configured to determine admissibility of the personal content by determining admissibility based on a determination regarding whether the personal content includes a digital fingerprint associated with known commercial content.

6. The apparatus of claim 1, wherein the apparatus is embodied at one of the source device, a device of the content protection system, or a device of a service platform associated with content distribution services.

7. A computer program product comprising at least one non-transitory computer-readable storage medium having computer-executable program code instructions stored therein, the computer-executable program code instructions comprising instructions for:
   receiving an indication of personal content submitted for inclusion in a content protection system;
   determining admissibility of the personal content to the content protection system based at least in part on indicia associated with a source device from which the personal content originated, said indicia verifying that the personal content comes from an authentic non-commercial source; and enabling admission of the personal content into the content protection system and maintaining the personal content separate from commercial content.

8. The computer program product of claim 7, wherein program code instructions for determining admissibility of the personal content include instructions for determining whether the personal content includes a usage state defining that unrestricted copying of the personal content is not allowable for devices not associated with an authorized domain of a user submitting the personal content for inclusion in the content protection system.

9. The computer program product of claim 7, further comprising program code instructions for enabling unrestricted movement and copying of admitted personal content to devices associated with an authorized domain of a user submitting the personal content for inclusion in the content protection system.

10. The computer program product of claim 7, wherein program code instructions for determining admissibility of the personal content include instructions for determining whether the personal content includes a watermark indicative of the source device.

11. The computer program product of claim 7, wherein program code instructions for determining admissibility of the personal content include instructions for determining admissibility based on a determination regarding whether the personal content includes a digital fingerprint associated with known commercial content.

12. A method comprising:
receiving an indication of personal content submitted for inclusion in a content protection system;
determining, via a processor, admissibility of the personal content to the content protection system based at least in part on indicia associated with a source device from which the personal content originated,
said indicia verifying that the personal content comes from an authentic non-commercial source; and
enabling admission of the personal content into the content protection system and maintaining the personal content separate from commercial content.

13. The method of claim 12, wherein determining admissibility of the personal content comprises determining whether the personal content includes a usage state defining that unrestricted copying of the personal content is not allowable for devices not associated with an authorized domain of a user submitting the personal content for inclusion in the content protection system.

14. The method of claim 12, further comprising enabling unrestricted movement and copying of admitted personal content to devices associated with an authorized domain of a user submitting the personal content for inclusion in the content protection system.

15. The method of claim 12, wherein determining admissibility of the personal content comprises determining whether the personal content includes a watermark indicative of the source device.

16. The method of claim 12, wherein determining admissibility of the personal content comprises determining admissibility based on a determination regarding whether the personal content includes a digital fingerprint associated with known commercial content.

17. An apparatus comprising:
means for receiving an indication of personal content submitted for inclusion in a content protection system;
means for determining admissibility of the personal content to the content protection system based at least in part on indicia associated with a source device from which the personal content originated,
said indicia verifying that the personal content comes from an authentic non-commercial source; and
means for enabling admission of the personal content into the content protection system and maintaining the personal content separate from commercial content.

* * * * *